May 1, 1934.  A. F. LARSEN  1,957,025
ROTARY COLANDER
Filed June 9, 1932
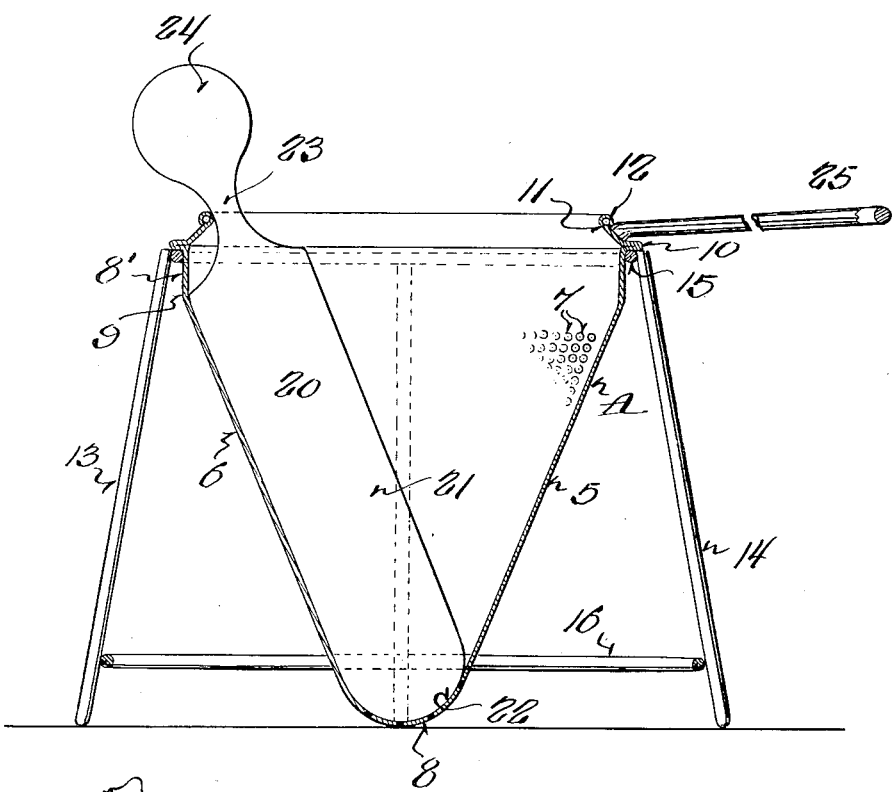
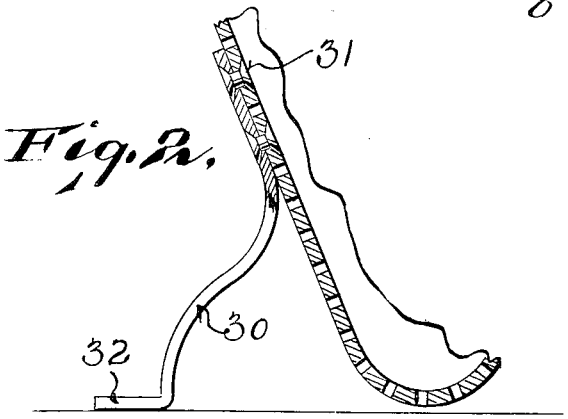
Inventor
Alantser F. Larsen
By Young Young
Attorneys Patented May 1, 1934

1,957,025

UNITED STATES PATENT OFFICE 1,957,025

ROTARY COLANDER

Alantser F. Larsen, Manitowoc, Wis., assignor to Aluminum Goods Manufacturing Company, Manitowoc, Wis.

Application June 9, 1932, Serial No. 616,235

1 Claim. (Cl. 146—172)

This invention appertains to colanders, fruit and vegetable strainers, etc., and more particularly to a colander, strainer or press of the type in which a rotary pestle is used for forcing the material through the perforations of the receptacle.

In rotary expressing devices of this character, a conical-shaped crusher or pestle is used. Certain disadvantages are inherent with pestles of this type, such as the cost and difficulty of manufacture and the fact that the pointed end of the pestle does not form an adequate bearing therefor. Further, the inclined sides of this type of pestle do not form the best means of engaging, crushing and forcing the material through the receptacle.

It is therefore one of the primary objects of my invention to provide a rotary colander or the like embodying a cylindrical pestle having a rounded lower end for effectively engaging the tapered end of the receptacle, the diameters of the rounded end of the pestle and the body of the pestle being the same, the resulting structure forming a pestle having parallel sides for effective rolling contact with the side wall of the receptacle.

A further salient object of my invention is the provision of a rotary colander or the like having a novel receptacle and a novel pestle for reception in the receptacle, the receptacle and pestle being so constructed as to insure a maximum amount of rolling contact therebetween with a minimum amount of likelihood of displacement of the pestle during operation thereof.

A still further object of my invention is to provide an improved device of the above character which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, in which:

Figure 1 is a vertical central section through the improved device.

Figure 2 is an enlarged fragmentary detail section illustrating a slightly modified form of my invention.

Referring to the drawing in detail, wherein similar reference characters designate the corresponding parts, the letter A generally indicates my improved colander which comprises an inverted conical-shaped receptacle 5, which can be formed from any desired material, such as aluminum. This receptacle 5 includes the conical side wall 6 provided with a plurality of perforations 7. The extreme lower end of the receptacle is provided with a rounded bottom wall 8, which is likewise provided with perforations. The upper edge of the side wall 6 is provided with a cylindrical extension 8', which forms a shoulder 9 for a purpose, which will be hereinafter more fully set forth. The upper end of the cylindrical extension 8' is provided with an outwardly extending annular shoulder 10 and the receptacle above the shoulder is flared inwardly as at 11 and is provided with an upper rolled bead 12.

In order to effectively support the receptacle, I provide a wire rack 13 which may include the supporting legs 14 connected at their upper and lower ends by means of rings 15 and 16. The legs 14 are preferably arranged in diverging relation so as to form a wide flaring base for effectively engaging a suitable support. The receptacle is adapted to be placed within the rack and the annular flange 10 is adapted to rest upon the upper ring 15.

Obviously, the material is adapted to be placed directly within the receptacle and to force the material through the apertures thereof, I provide a rotary pestle 20 which is of a novel construction.

The rotary pestle 20 comprises a cylindrical body portion 21 having a rounded lower end 22. As shown, the diameter of the rounded lower end 22 is equal to the diameter of the cylindrical body 21 and this rounded lower end is adapted to be snugly received in the rounded lower end of the strainer or receptacle 5. This forms an effective bearing for the pestle and insures proper rolling contact of the pestle with the receptacle and prevents undue wear on the lower end of the receptacle. Likewise, by forming the body portion 21 of the pestle of uniform diameters throughout its length proper rolling contact is also assured between the pestle and the side wall 6 of the receptacle.

It is to be noted that the length of the body portion 21 of the pestle is equal to the height of the side wall 6 of the receptacle and that the upper end of the pestle terminates directly at the shoulder 9 on the receptacle which functions to prevent accidental displacement of the pestle while the same is in use and being moved around the receptacle. The extreme upper end of the body portion 21 of the pestle has formed thereon a reduced shank 23 which is adapted to engage the bead 12 formed on the inwardly flared extension 11 of the receptacle. A spherical knob or hand grip 24 is formed on the shank and lies above the inwardly flared extension 11 of the receptacle. The provision of the inwardly flared extension 11 and the bead 12 acts in conjunction with the reduced shank 23 to form a rolling bearing contact for the upper end of the pestle.

Any desired type of handle may be connected with the receptacle in order to insure the proper manipulation thereof and as shown, I have provided a handle 25, which may be formed from wire or the like.

In operation of my device the material to be handled is placed directly in the receptacle and the curved lower end of the pestle is seated in the curved bottom wall 8 of the receptacle. The hand of the user is placed on the spherical knob 24 and the pestle is given a rotary motion around the receptacle, so as to be effectively crush the material between the pestle and the inclined wall 6 of the receptacle. This will effectively force the material through the perforations in the receptacle and owing to the form of the pestle and receptacle, this operation is easily accomplished without undue exertion on the part of the operator and without undue strain on the parts of the device.

If preferred, the stand or rack 13 can be eliminated and in lieu thereof supporting legs 30 can be secured directly to the wall of the colander. This construction is shown in Figure 2 of the drawing, and it will be noted that rivets 31 can be utilized for securing the legs in position. The lower ends of the legs 30 can be flared outwardly to provide supporting feet 32. This forms an adequate enlarged supporting base for the colander.

Changes in details may be made without departing from the spirit or the scope of this invention, but what I claim as new is:

A rotary colander comprising an inverted conical-shaped receptacle having a substantially semi-spherical bottom wall, and a pestle for reception in said receptacle including a cylindrical body portion of the same diameter throughout its entire length forming parallel crushing sides, said pestle also having a substantially semi-spherical lower end for reception in the semi-spherical bottom wall of the receptacle, the diameter of the lower end of the pestle corresponding to the diameter of the semi-spherical bottom wall.

ALANTSER F. LARSEN.